United States Patent
Parry

(10) Patent No.: US 7,106,470 B2
(45) Date of Patent: *Sep. 12, 2006

(54) DIRECT PRINTING FROM INTERNET DATABASE

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 607 days.

This patent is subject to a terminal disclaimer.

(21) Appl. No.: 09/925,651

(22) Filed: Aug. 10, 2001

(65) Prior Publication Data

US 2003/0030841 A1    Feb. 13, 2003

(51) Int. Cl.
*G06F 3/12* (2006.01)
*G06F 15/00* (2006.01)
*G06K 1/00* (2006.01)

(52) U.S. Cl. .................. 358/1.15; 358/1.14; 358/1.16; 358/1.17; 358/1.18

(58) Field of Classification Search ................ 358/1.5, 358/1.12, 1.13, 1.14, 1.15, 434, 1.18; 707/3, 707/5, 10, 15, 62; 709/224; 710/62
See application file for complete search history.

(56) References Cited

U.S. PATENT DOCUMENTS

| | | | |
|---|---|---|---|
| 5,848,413 A * | 12/1998 | Wolff | 707/10 |
| 5,873,077 A * | 2/1999 | Kanoh et al. | 707/3 |
| 5,956,487 A | 9/1999 | Venkatraman et al. | |
| 6,348,970 B1 * | 2/2002 | Marx | 358/1.15 |
| 6,375,078 B1 | 4/2002 | Russell et al. | |
| 6,429,946 B1 * | 8/2002 | Bresnan et al. | 358/1.15 |
| 6,434,561 B1 | 8/2002 | Durst, Jr. et al. | |
| 6,537,324 B1 | 3/2003 | Tabata et al. | |
| 6,609,843 B1 | 8/2003 | Mahoney et al. | |
| 6,738,841 B1 * | 5/2004 | Wolff | 710/62 |
| 2002/0065910 A1 * | 5/2002 | Dutta | 709/224 |
| 2002/0131071 A1 | 9/2002 | Parry | |
| 2003/0030834 A1 | 2/2003 | Parry | |
| 2003/0030840 A1 | 2/2003 | Parry | |
| 2005/0024682 A1 * | 2/2005 | Hull et al. | 358/1.18 |

* cited by examiner

*Primary Examiner*—Kimberly Williams
*Assistant Examiner*—Satwant Singh

(57) ABSTRACT

A method, program product, and system for printing, comprising the steps of: receiving data at a printer; detecting an external network address in the received data; obtaining at least one parameter of a document at the external network address; determining if the at least one parameter meets a predetermined first criteria; if the at least one parameter meets the first criteria, then retrieving the document from the external network address; and printing the document.

22 Claims, 4 Drawing Sheets

DIRECT PRINTING FROM INTERNET DATABASE

FIELD OF THE INVENTION

The present invention relates generally to the field of printers, fax machines, and copiers, and more particularly, to such devices which access documents either directly or indirectly from the internet.

SUMMARY OF THE INVENTION

Briefly, the present invention comprises, in one embodiment, a printing method, comprising the steps of: receiving data at a printer; detecting an external network address in the received data; obtaining at least one parameter of a document at the external network address; determining if the at least one parameter meets a predetermined first criteria; if the at least one parameter meets the first criteria, then retrieving the document from the external network address; and printing the document.

In a further aspect of the present invention, the detecting an external network address step comprises detecting a barcode in the received data and translating the barcode to the external network address.

In a further aspect of the present invention, the external network address is a URL.

In a further aspect of the present invention, the first criteria is a predetermined document length.

In a further aspect of the present invention, the first criteria is a download time.

In a further aspect of the present invention, the first criteria is that the document is available.

In a further aspect of the present invention, the first criteria is that a change notice has not been received.

In a further aspect of the present invention, if the at least one parameter does not meet the first criteria, then not retrieving the document from the external network address.

In a further aspect of the present invention, if the at least one parameter does not meet the first criteria, then prompting a user to choose whether to select an option.

In a further aspect of the present invention, the option includes whether to cancel or continue the print job.

In a further aspect of the present invention, the option includes whether to perform a modified document retrieval.

In a further aspect of the present invention, the prompting the user step comprises providing a display at the printer.

In a further aspect of the present invention, the prompting the user step comprises sending a message to a site where the print authorization occurred.

In a further aspect of the present invention, if the at least one parameter does not meet the first criteria, then determining if one of the parameters of the document meets a second criteria; and if one of the parameters meets the second criteria, then performing a modified document retrieval.

In a further aspect of the present invention, the second criteria is whether the document has a summary or an index; and wherein the performing the modified document retrieval step comprises retrieving only the summary and/or the index of the document.

In a further aspect of the present invention, if the at least one parameter does not meet the first criteria, then determining if one of the parameters of the document meets a second criteria; and if it does then prompting the user to select a modified retrieval of the document.

In a further aspect of the present invention, the modified document retrieval comprises printing only a summary and/or an index.

In a further aspect of the present invention, the modified document retrieval comprises printing a first predetermined number of pages in the document.

In a further aspect of the present invention, the step is provided of presenting the user an opportunity to set at least one criteria.

In a yet further embodiment of the present invention, a program product is provided for printing including machine readable code for causing a system to perform the following method steps: receiving data at a printer; detecting an external network address in the received data; obtaining at least one parameter of a document at the external network address; determining if the at least one parameter meets a predetermined first criteria; if the at least one parameter meets the first criteria, then retrieving the document from the external network address; and printing the document.

In a yet further embodiment of the present invention, a system is provided for printing, comprising: a component for receiving data at a printer; a component for detecting an external network address in the received data; a component for obtaining at least one parameter of a document at the external network address; a component for determining if the at least one parameter meets a predetermined first criteria; a component for, if the at least one parameter meets the first criteria, then retrieving the document from the external network address; and a component for printing the document.

DETAILED DESCRIPTION OF THE PREFERRED EMBODIMENTS

Figure 1:
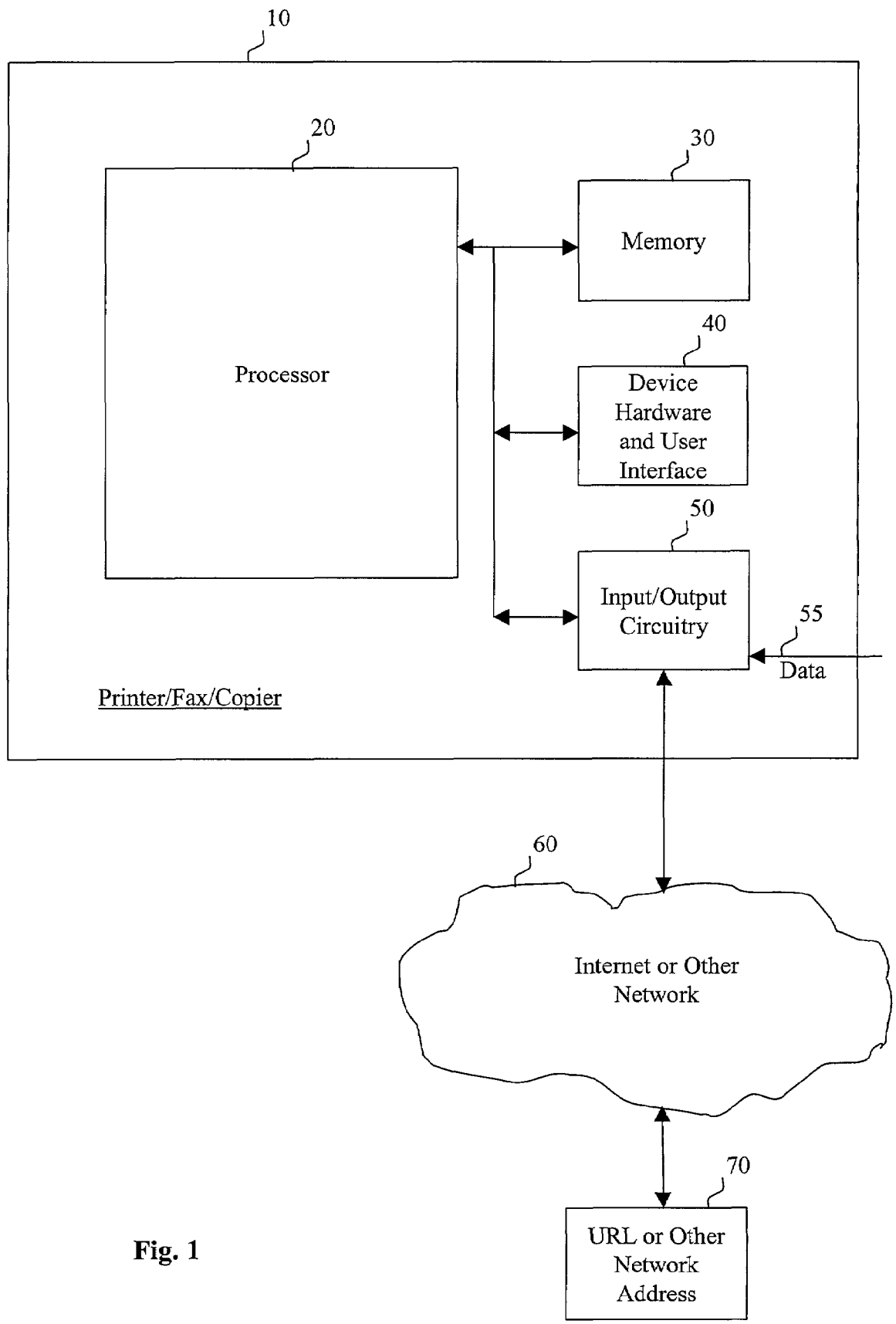
FIG. 1 is a schematic block diagram of an overall system which may be utilized to implement the present invention.

A preferred embodiment of the present invention is implemented utilizing a printer 10. One skilled in the art will recognize that the implementation to be described may also be applied to a facsimile machine or a copier machine. In one embodiment of the implementation of the present invention, the device 10 may include a processor 20, a memory 30, device specific hardware and a user interface 40, and input/output circuitry 50. The processor 20 performs device specific functions for the device 10 in combination with the device specific hardware 40. In the embodiment where the device 10 is a printer, the processor 20 and the memory 30 perform image rendering functions and the device specific hardware 40 includes printer hardware and associated circuitry. The input/output circuitry 50 for such a printer provides network access to the printer device 10. It is preferred that the device specific hardware and user interface 40 include a display screen for providing information and selection options to a user, as well as various buttons and other controls for the user to make selections.

In a preferred embodiment of the present invention, web server functionality is embedded in the printer device 10 by providing software or firmware for the processor 20, by utilizing space available in the memory 30 and by using the existing input/output circuitry 50 such as Ethernet circuitry to transfer HTML files. Implementations of such web access software are widely available in the art. This web access software on the processor 20 would operate to access a URL (Universal Resource Locator) or other external network address at a remote device 70 by means of the internet 60 or other external network. The purpose for this access to the URL at the device 70, which will be explained in more detail below, is to retrieve a document thereat for printing/copying/faxing at the device 10 or another device selected by the user.

In an alternative embodiment, the web server functionality need not be included in the device 10. Rather the input/output circuitry 50 can be connected to a communications network to thereby connect to an internet access device (not shown) for accessing a URL 70 or other external network address via the internet 60. By way of example, this communications network could be a wide area network (WAN), an internetwork, a public telephone network or a private value added network (VAN). Alternatively, the communications network could be implemented using any combination of these different kinds of communications networks. A desired URL would be sent to this internet access device on the communications network to thereby access the web and a document on the URL 70.

Figure 2A:
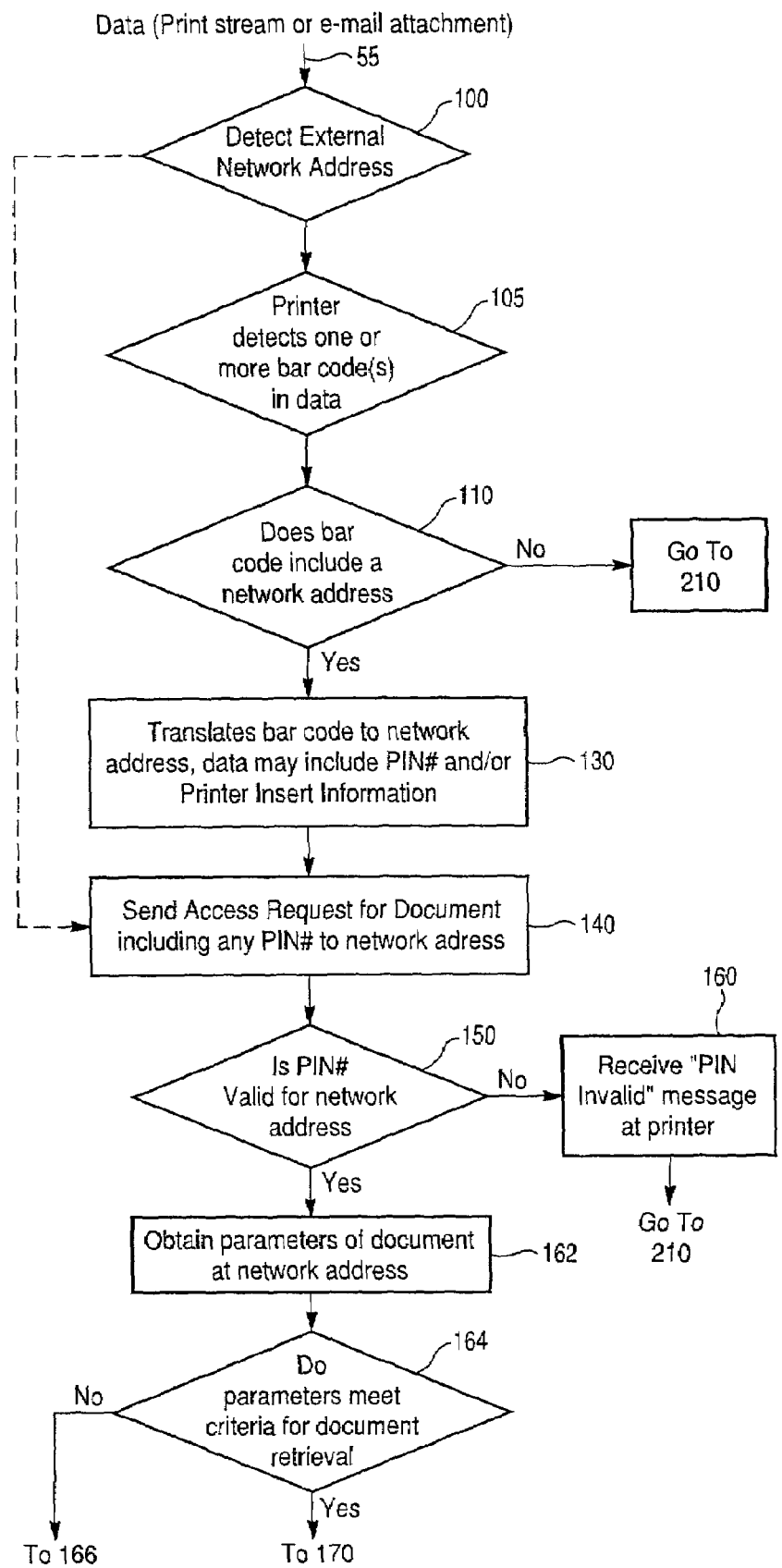
FIGS. 2A and 2B comprise a block diagram flow chart of the method steps and computer program which may be utilized to implement a preferred embodiment of the present invention.
Figure 2B:
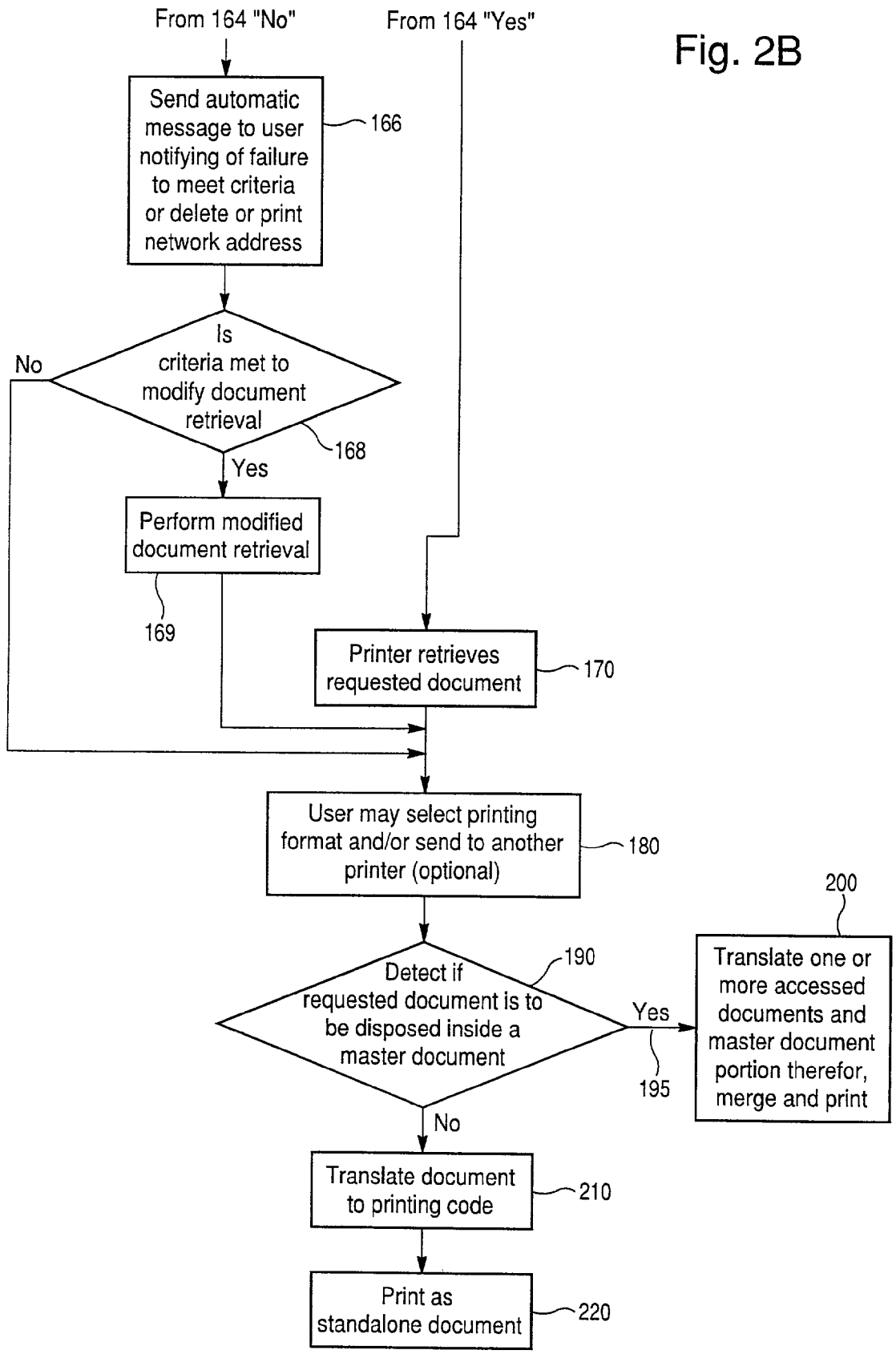

Referring now to FIG. 2, a preferred embodiment of the method and system and program product of the present invention which may be implemented using the structure of FIG. 1 is shown.

As a first step of the method, data is applied on line 55 to the input/output circuitry 50 of the device 10. This is represented in FIG. 2 by the line 55. By way of example, this data could be a print stream. Alternatively, this data could comprise an email, or an attachment to an email, or data that is scanned into the printer system. The first step in the execution, represented by block 100, is for the printer or other device 10 to detect one or more encrypted or non-encrypted network addresses in the data on line 55. By way of example but not be way of limitation, this detection could be accomplished by detecting delimiters at the front and the end of the external network address. Such delimiters could comprise UML tags or PJL commands. In a preferred embodiment, the network address could be a URL or other reference. Additionally, the execution could also detect a pin number and/or a location identifier or a document type identifier to be discussed in more detail below. Such pin number and/or location identifier or document type could be detected in any convenient manner, including through the use of delimiters. In one embodiment, if a network address is detected, then the execution could jump directly to block 140, to be discussed below.

If no network address is detected, or in some embodiments even when a network address is detected, the execution would proceed to block 105 to determine if a barcode is present in the data stream. By way of example, but not by way of limitation, the barcode could be detected by interpreting a wrapper or delimiter that indicates that the wrapped data is a barcode. In one implementation of this embodiment, the block 105 could comprise the printer detecting one or more barcodes in the data stream.

If no URL or other embedded reference is detected in the barcode, then the execution moves to block 210 and the barcode is printed as regular data. If the printer processor 20 detects at least one barcode in the data, then the execution moves to block 110, wherein it is determined whether the barcode includes a URL or other network address reference.

It should be noted that the term URL is used as one example of an implementation of the present invention, and it is understood that the present invention is not limited to only the use of URLs, but may be used to detect and use any convenient network address.

Block 130 translates the barcode to a URL or other reference. In one embodiment, the barcode may additionally include a PIN number which may be used to verify authorization to access the remote URL or other reference. Additionally, the barcode may also include printer insert information if the document to be retrieved from the network address is to be inserted inside a master document. This printer insert information may include, by way of example but not by way of limitation, coordinates within a portion of the master document, such as a page, at which the network document is to be inserted, or other information such as a document type which may be utilized in accordance with a rule to determine where to insert the network document within the master document. For example, a map document at the network address may be designated with the document type "MAP", and inserted to a location in the master document labeled "MAP".

The execution then moves to block 140, either directly from block 100, as noted earlier, or from the translation block 130. In block 140 an access request is generated and sent on the internet 60 to retrieve the document at this network address. As noted above, this access request may include a PIN number.

In block 150 it is determined whether a PIN number, if one is present, is valid for this URL or other network address. If the PIN number is not valid, then the message "PIN Invalid" or other convenient message is received at the printer, per block 160. In a preferred embodiment, the printer or another device could then generate and send a message that could include the network address, alerting the user or another that an invalid pin # has been received. Then the execution moves to block 210 and the bar code or network address is printed as regular data in the print stream with other data being printed.

Alternatively, if the PIN number is determined to be valid for the access to the URL or other network address, then the execution moves to block 162, wherein parameters of the document or other information at the external network address are obtained. Typically, these parameters would be obtained by an access to the network address, but might also be obtained by access to a directory or other service at a different location or address. The parameters might include whether the document is available at the network address, the total number of pages in the document at the network address, access speed from that network address, whether the document is subject to security procedures such as virus protection, and whether the document has been updated after a change notice. The foregoing are example parameters only, and a variety of other parameters could be included.

The execution then proceeds to block 164 wherein one or more of the obtained parameters would be compared to threshold values or other information to determine if the one of more parameters meet specified criteria, based on one or more rules. Such criteria might include one or more of, a value for a total number of pages in the document at the network address, or a value for a download time for downloading or printing the document, or a dynamic comparison of a number of sheets left in the printer or other printer limitation such as ink supply relative to the number of pages in the document, or simply whether the document is available at the external network address, or whether there has been an unfulfilled change notice provided for the document indicating that the document at the external network address is out-of-date, or indicating that the external network address is not subject to security measures such as virus detection. There are a variety of other criteria that could also be used, and the present invention is not limited to any particular one or more of such criteria.

The criteria to be used in the present invention could be set by the user, or a systems administrator, or in some other convenient manner such as automatically. If set by the user or the systems administrator, then the setting process might comprise the presentation of a screen on the user's browser through web content, or the presentation on the display of the systems administrator, of one or more prompts or to select one or more criteria to use in the present invention.

Referring again to block 164, and by way of example but not by way of limitation, if one of the criteria was set to be a maximum of 20 pages for the document length, then the actual parameter for the document length at the external network address would be compared to this document length threshold criteria. If the document length value was 12, e.g., less than the maximum document length criteria of 20 in this example, then the execution would proceed to block 170, wherein the printer retrieves the requested document.

Alternatively, if the length parameter of the documents is 30, e.g., it exceeds the maximum document length threshold criteria, then the execution proceeds to block 166. Block 166 could represent a variety of different options. By way of example but not by way of limitation, this block could simply delete the document request from the network address, or print the network address in its normal location or in another location in the print stream. In this case, the execution would proceed directly from block 166 to block 210, to be discussed below.

Alternatively, block 166 could display or send an automatic message to the user or another person or the system notifying of the failure to meet one or more of the criteria. This notice might also include a menu display to the user or other person or to an administrator to select an option, such as to cancel the job, or to continue the job, or to perform a modified document retrieval. Typically, this menu display would be provided to the site where the job authorization was made.

If the user or other person selects a modified document retrieval, such a modified document retrieval at block 169 could occur automatically, or after a user selection, or could occur after it is determined if the document at the network address meets a second criteria. By way of example but not by way of limitation, the modified document retrieval at block 169 might comprise only retrieving an abstract, and/or a summary, and/or an index in the document. Alternatively, the modified document retrieval at block 169 might comprise retrieving only a predetermined number of pages of the document. A wide variety of other modified retrievals are possible and within the scope of the present invention.

As noted, such a modified document retrieval could be performed automatically after a failure to meet criteria in block 164, or after a user selection in block 166. Alternatively, the execution could proceed to block 168 to determine if a second criteria is met by the document parameters. This second criteria might comprise whether the network document contains an abstract, or a summary, or an index. This block could also provide a display to pop up to the user either inform the user that a modified retrieval will take place, or to provide a selection of what modified retrievals are available to the user, such as abstract, summary, and/or index, and prompting the user to make such a selection.

If the criteria for block 164 are met, then at block 170, the printer retrieves the requested document. Optionally, the execution may then move to block 180 wherein the device hardware and user interface 40 displays printing format selection options to a user. Additionally, or alternatively, the option to send this retrieved document to another printer may be provided. For this optional execution block, the user would be given the opportunity by means of various buttons and other appropriate controls to make a selection of the printing format and/or transmission of the document to another printer or other appropriate device. Note that this optional execution block 180 could be located anywhere within the process.

The execution then moves to block 190 wherein it is detected if the requested document is to be disposed inside a master document. If the answer is NO, then the execution moves to block 210 and the retrieved URL document is translated to printing code. Note that the retrieved URL document will include format information for the layout of the document. The execution then moves to block 220 wherein the translated document is printed on the device hardware 40 under the control of the processor 20. The process could then loop back to block 100 and look for additional network addresses and barcodes to process.

Alternatively, if it is determined that the retrieved URL document is to be disposed inside a master document, then the execution moves to block 200. In block 200, one or more retrieved URL documents and a master document portion or the master document in its entirety are translated into a predetermined format, merged and printed.

Figure 3:
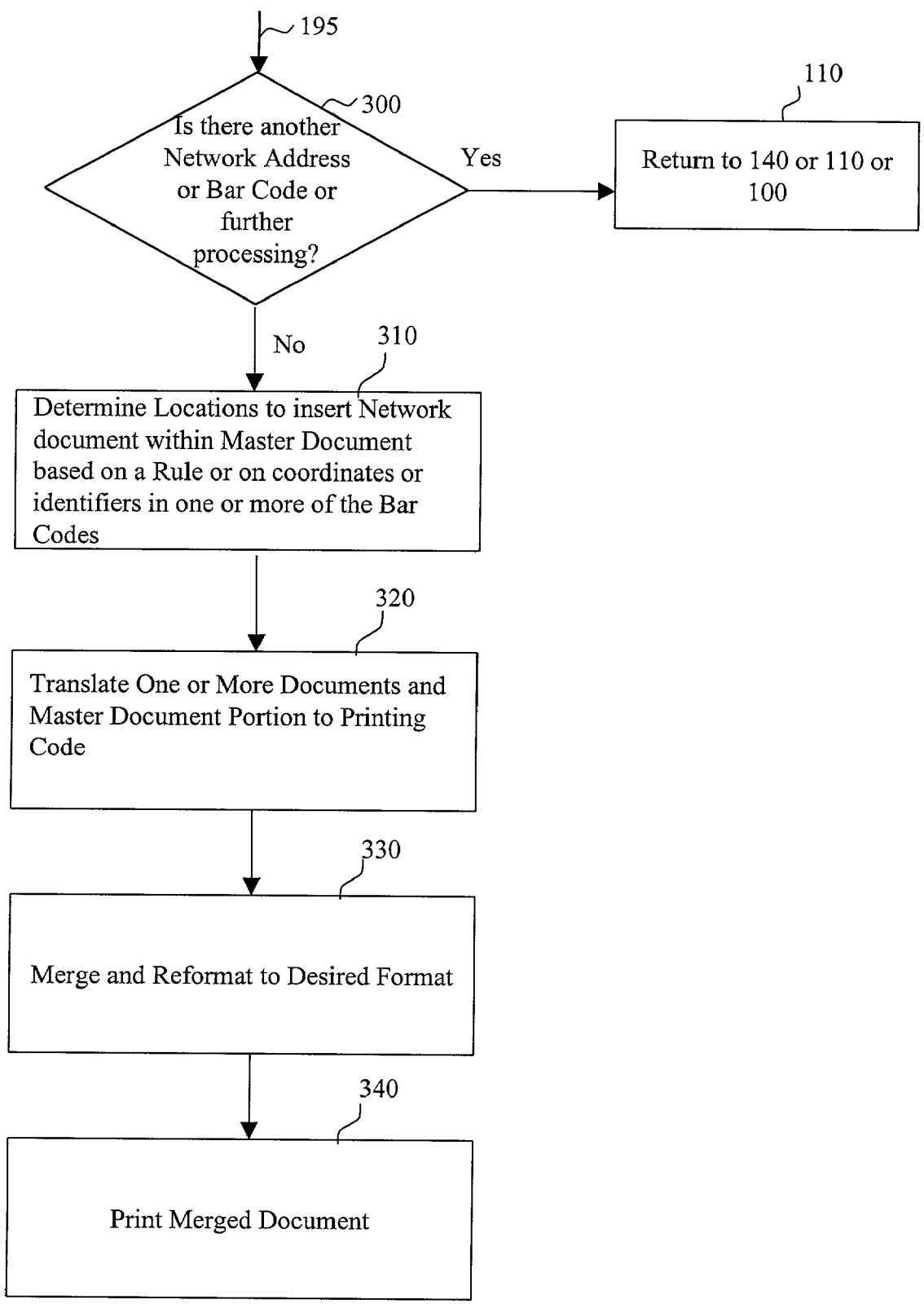
FIG. 3 is a block diagram flow chart providing further details of block 200 in FIG. 2.

Referring now to FIG. 3, additional method and operational details are provided for the execution block 200. Referring to FIG. 3, the retrieved URL document is applied on line 195 to block 300.

In execution of block 300, it is determined whether there is an additional network address or bar code to process. If the entire data stream for the master document or a portion thereof has been already reviewed and all of the network addresses detected or barcodes detected, and if the additional item is a network address, then in block 305 the execution would proceed to block 140 in FIG. 2 and continue the process. Alternatively, if the additional item is a barcode, then the execution proceeds to block 110 and continues the process. Alternatively, if the system did not initially detect all of the network addresses or barcodes on the data stream, then the execution would proceed to 100 and continue the process. Accordingly, additional documents may be retrieved at other network addresses. Multiple different documents at a variety of different remote network addresses may be retrieved in this manner and returned to the device 10. When all of the network addresses and/or barcodes on the master document portion that is to be printed have been translated and the network addresses accessed and the network documents retrieved, then the execution moves to block 310.

It should be noted that depending on the printing software utilized, it may be desirable to perform this process on a page by page basis, or more generally, a portion by portion basis, for the master document. Accordingly, all of the network addresses and barcodes on a particular page that is to be printed are accessed so that those network documents can be merged into that particular master document page. That document page would then be printed, and the printer would then move on to the next page in the master document and search for network addresses and barcodes in the printing data therefore. Alternatively, the printing software may detect all of the network addresses and barcodes in the entire master document and retrieve the documents at various remote network addresses to allow the translation and merger of those network documents with the master documents in one operation. Whether the software utilized operates on a portion by portion basis or retrieves all of the network addresses for the entire master document at one time is a design choice within the skill of the art.

As noted, if there are no more network addresses or barcodes to be translated and network documents to be accessed for the portion of the master document to be printed, then the execution moves to block 310 wherein it is determined in which location or locations to insert the network documents within the master document. The locations for insertion of the various retrieved network documents within the master document may be based on coordinates included within each of the network addresses or different barcodes. Alternatively, the locations may be determined in accordance with a rule. By way of example but not by way of limitation, the rule could comprise simply inserting into a set of blocks within the master document the network documents in the order in which the network addresses or barcodes were detected. Alternatively, this rule could comprise using an identifier or tag translated from each of the different network addresses or barcodes to insert the respective document associated with that barcode to a space which is identified by the respective identifier within that document. By way of example, an identifier could identify the document type to be an "EXECUTIVE SUMMARY", and there could be an insert box within the master document which includes an identifier "EXECUTIVE SUMMARY" that matches the identifier.

The then execution moves to block 320 wherein the one or more network documents and the master document portion are translated to printing codes.

The execution then moves to block 330 wherein the one or more network documents and the master document portion are merged and reformatted to a desired format. By way of example but not by way of limitation, a typical format for printing would be PCL or Postscript. The execution then moves to block 340 wherein the merged document portion or the entire document is printed by the device hardware 40.

Note that there may be situations wherein web access capability is not available at the device 10. In this situation where there is no web access capability within the device 10, then after the network address is obtained directly or obtained after translation from a barcode, then the execution moves to a block wherein a search query is sent out on a communications network via the input/output circuitry 50 (FIG. 1) to connect to an internet access device for accessing the web. By way of example, this communications network could simply comprise an intranet and the access could be to a web access software module or to a web server on the intranet. This internet access device would then be utilized to access the network address by means of the internet 60. If the PIN number, if any, is determined to be valid by this URL 70, then the requested document is retrieved back to the internet device, and from that device it is provided to the printer device 10 for printing as described previously for FIG. 2.

It should be noted that the present invention is particularly advantageous for summary reports, wherein various sections of the report are being continuously updated. The present invention, by means of the insertion of one or more network addresses or barcodes within a master document, allows a report to be updated on the fly by accessing a plurality of different URL's or other network addresses which are maintained with up-to-date information. In one aspect, a company could maintain a variety of its documents on the internet but accessible only by means of a PIN number or some other security operation. This invention would allow access to such documents without the need for firewalls. Additionally, the present invention is particularly advantageous in that it provides an accurate rendition of a URL or other network address, via the direct detection of a network address or via a translation of a barcode, without the need for human intervention with the potential for typographical errors. Accordingly, an error free transmission of a document to a printer or other device such as a fax machine or copier, can be accomplished simply by sending an email with one or more barcodes embedded therein.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printing method, comprising the steps of:
receiving print stream data at a printer;
detecting an external network address in the received print stream data;
obtaining at least one parameter of a document at the external network address;
determining if the at least one parameter meets a predetermined first criteria;
if the at least one parameter meets the first criteria, then retrieving the document from the external network address;
merging the document into the print stream data to form a modified document; and
printing the modified document.

2. The method as defined in claim 1, wherein the detecting an external network address step comprises detecting a barcode in the received data and translating the barcode to the external network address.

3. The method as defined in claim 1, wherein the external network address is a URL.

4. The method as defined in claim 1, wherein the first criteria is a predetermined document length.

5. The method as defined in claim 1, wherein the first criteria is a download time.

6. The method as defined in claim 1, wherein the first criteria is that the document is available.

7. The method as defined in claim 1, wherein the first criteria is that a change notice has not been received.

8. The method as defined in claim 1, wherein if the at least one parameter does not meet the first criteria, then the document is not retrieved from the external network address.

9. The method as defined in claim 1, wherein if the at least one parameter does not meet the first criteria, then prompting a user to choose whether to select an option.

10. The method as defined in claim 9, wherein the option includes whether to cancel or continue the print job.

11. The method as defined in claim 9, wherein the option includes whether to perform a modified document retrieval.

12. The method as defined in claim 9, wherein the prompting the user step comprises providing a display at the printer.

13. The method as defined in claim 9, wherein the prompting the user step comprises sending a message to a site where print authorization occurs.

14. The method as defined in claim 1, wherein if the at least one parameter does not meet the first criteria, then determining if one of the parameters of the document meets a second criteria;
and if one of the parameters meets the second criteria, then performing a modified document retrieval.

15. The method as defined in claim 14, wherein the second criteria is whether the document has a summary or an index; and wherein the performing the modified document retrieval step comprises retrieving only the summary and/or the index of the document.

16. The method as defined in claim 1, wherein if the at least one parameter does not meet the first criteria, then determining if one of the parameters of the document meets a second criteria; and if it does then prompting the user to select a modified retrieval of the document.

17. The method as defined in claim 16, wherein modified document retrieval comprises printing only a summary and/or an index.

18. The method as defined in claim 16, wherein the modified document retrieval comprises printing a first predetermined number of pages in the document.

19. The method as defined in claim 1, further comprising the step of presenting the user an opportunity to set at least one criteria.

20. A program product for printing comprising:
a computer readable medium having machine readable program code embodied therein to be executed by a computer the machine readable program code comprising:
computer code for receiving print stream data at a printer;
computer code for detecting an external network address in the received print stream data;
computer code for obtaining at least one parameter of a document at the external network address;
computer code for determining if the at least one parameter meets a predetermined first criteria;
computer code for if the at least one parameter meets the first criteria, then retrieving the document from the external network address;
computer code for merging the document with the print steam data and forming a modified document; and
computer code for and printing the document.

21. A system for printing, comprising:
a component for receiving a print stream data at a printer;
a component for detecting an external network address in the received print stream data;
a component for obtaining at least one parameter of a document at the external network address;
a component for determining if the at least one parameter meets a predetermined first criteria;
a component for, if the at least one parameter meets the first criteria, then retrieving the document from the external network address;
a component for merging the document with the print stream data to form a modified document; and
a component for printing the modified document.

22. A printing method, comprising the steps of:
receiving print stream data at a printer;
detecting an external network address in the received print stream data;
determining a size of a document at the external network address;
determining if the size of the document meets a predetermined size criteria;
if the determined size meets the size criteria, then retrieving the document from the external network address;
merging the document into the print stream data to form a modified document; and
printing the modified document.

* * * * *